No. 824,689. PATENTED JUNE 26, 1906.
E. G. FLAGER & F. L. McGAHAN.
FLUID FUEL BURNER.
APPLICATION FILED SEPT. 22, 1902. RENEWED DEC. 18, 1905.

Witnesses
W. H. Alexander
L. B. Beach

Inventors
F. L. McGahan
E. G. Flager
By Attorneys
Fowler & Bryson

UNITED STATES PATENT OFFICE.

EDWARD G. FLAGER AND FRED L. McGAHAN, OF ST. LOUIS, MISSOURI, ASSIGNORS TO NATIONAL LIGHT, HEAT & POWER COMPANY, A CORPORATION OF MISSOURI.

FLUID-FUEL BURNER.

No. 824,689.      Specification of Letters Patent.      Patented June 26, 1906.

Application filed September 22, 1902. Renewed December 18, 1905. Serial No. 292,157.

*To all whom it may concern:*

Be it known that we, EDWARD G. FLAGER and FRED L. McGAHAN, citizens of the United States, residing at the city of St. Louis, in the State of Missouri, have invented a certain new and useful Fluid-Fuel Burner, of which the following is such a full, clear, and exact description as will enable any one skilled in the art to which it appertains to make and use the same, reference being had to the accompanying drawings, forming part of this specification.

Our invention relates to burners for fluid fuels, such as crude petroleum, and has for its object to provide a burner which may be used in lamps and for other similar purposes and which by a properly-directed supply of the fuel and air will bring about perfect combustion.

Figure 1:
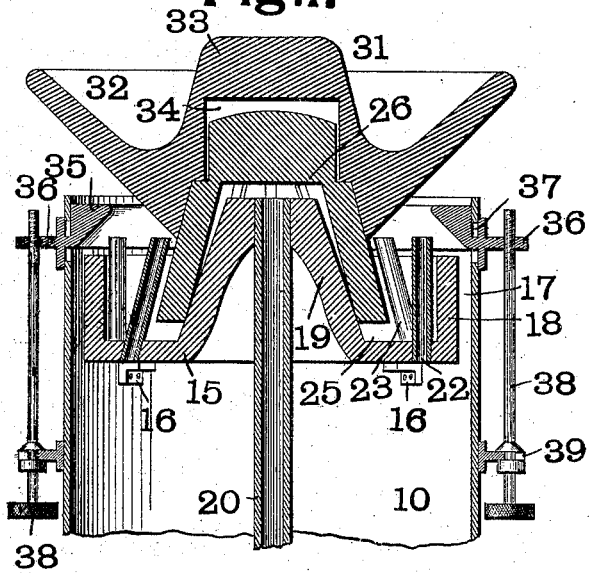
Figure 2:
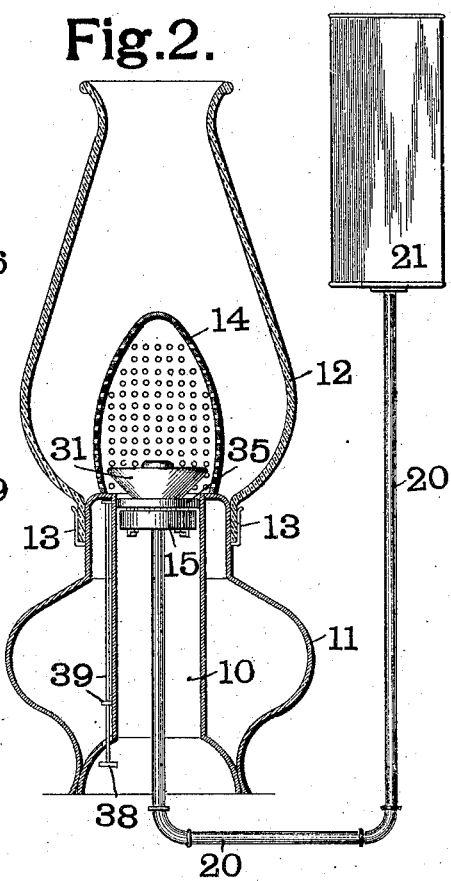
Figure 3:
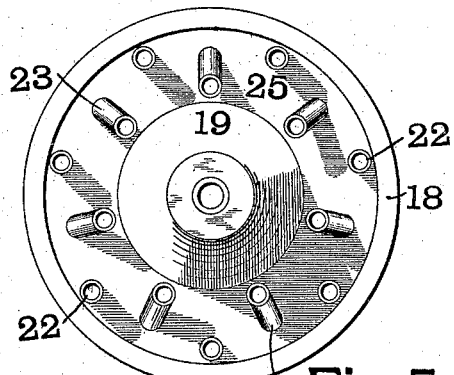
Figure 4:
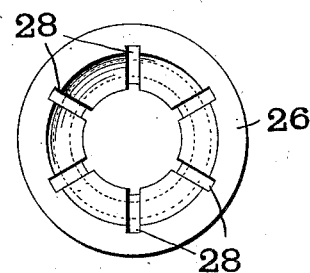
Figure 5:
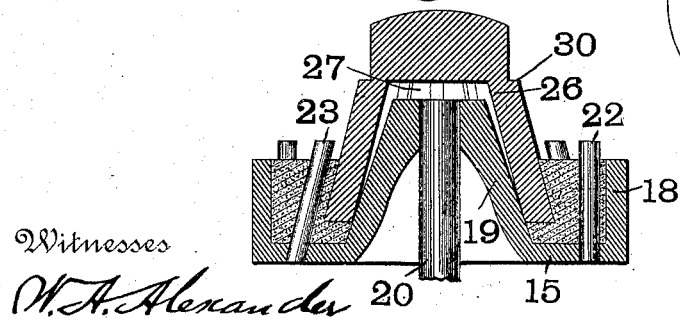

In the drawings, in which like characters of reference refer to similar parts in the different views, Figure 1 is a vertical section of the burner and casing. Fig. 2 shows in section the burner applied to a lamp. Fig. 3 is a top plan view of the base of the burner. Fig. 4 is a detail view of a part of the burner, and Fig. 5 is a vertical section of the base and the superposed portion forming the oil-chamber.

In the drawings, 10 is an open-ended casing forming an air-flue through the middle of the base 11 of the lamp. This base 11 is provided with a chimney 12, mounted thereupon and held in position by a spring-clamp 13. A perforated mantle 14 is mounted upon the top of the base and surrounds the upper end of the casing 10. The burner itself, which is mounted in the upper end of the casing 10, may be said to consist of three portions.

15 represents the base portion of the burner, which is circular in form and is supported by means of brackets 16, attached to the sides of the casing 10. The relative diameters of the base 15 of the burner and the interior of the casing 10 are such that an air-passage 17 is left between them. The periphery of the base 15 is provided with an upwardly-projecting flange 18. Concentrically formed on the upper side of the base 15 is a hollow truncated cone 19. Through the top of this cone 19 passes the pipe 20, by means of which oil is supplied to the burner under pressure from the tank 21. The base 15 is also provided with an outer set of tubes 22 and an inner set of tubes 23, forming air-passages through said base. The tubes 23 are inclined inwardly through the center of the base. Both sets of tubes extend to a point a short distance above the flange 18. Between the flange 18 and the cone 19 is formed the catch-basin 25.

26 represents the middle portion of the burner, which is provided with a socket and adapted to surround the truncated cone 19 to form the oil-chamber 27. The inner surface of this middle portion 26 is provided with a number of grooves 28, which serve to conduct the oil-supply from said chamber to the catch-basin 25. A shoulder 30 is formed on the outer surface of the middle portion 26. Upon this shoulder 30 rests the top portion of the burner 31. This top portion 31 is formed with flaring sides and has in its upper surface a depression 32, surrounding a raised central portion 33, in which the socket 34, which receives the upper portion of the middle portion, is formed.

35 is an air-deflector in the form of a ring having a beveled inner surface which serves to direct centrally the air passing upward through the air-passage 17. This air-deflector 35 also serves as a valve to completely close the air-passage 17 when it is desired to do so. It is provided with lugs 36, projecting outward through slots 37 in the casing 10.

38 represents thumb-screws passing through and bearing against the eyes 39, carried by the outer side of the casing 10. The upper ends of these thumb-screws are screw-threaded and engage with screw-threaded openings in the lugs 36. By means of these thumb-screws the position of the air-deflector 35 in the casing 10 may be regulated as desired.

The catch-basin 25 is filled, as shown in Fig. 5, with a body of refractory porous material, such as asbestos fiber, fire-clay, mica, quartz, or other granulated or powdered substances.

In the operation of our invention oil is supplied under pressure by means of the pipe 20 to the oil-chamber 27, whence it flows by means of the ducts or grooves 28 into the material in the catch-basin 25. The oil then passes through said porous material under pressure from the tank 21 and at the top thereof is gasified by the heat produced by the burner and burned, the air for supporting combustion being supplied by means of the air-passage 17 and the tubular air-passages 22 and 23.

Having fully described our invention, what we claim as new, and desire to secure by Letters Patent of the United States, is—

1. The combination with a fluid-receptacle, of a projection carried thereby, a cap surrounding said projection, means for feeding fluid fuel between said projection and cap, an outwardly-projecting deflector carried by said cap, a set of vertical pipes passing through said receptacle, and a set of inwardly-inclined pipes passing through said receptacle.

2. The combination with a fuel-receptacle, of a projection carried thereby, a cap surrounding said projection, means for feeding fluid fuel between said projection and cap, an outwardly-projecting deflector carried by said cap, a filling of porous refractory material in said fuel-receptacle, a set of vertical pipes passing through said receptacle, and a set of inwardly-inclined pipes passing through said receptacle.

3. The combination with a fuel-receptacle, of a projection extending upwardly therefrom, a cap surrounding said projection, means for feeding fluid fuel between said projection and cap, an outwardly-extending deflector carried by said cap, air-pipes extending through said receptacle and terminating adjacent to said deflector, and an inwardly-projecting deflector surrounding said fuel-receptacle.

4. The combination with a fuel-receptacle, of a projection extending upwardly therefrom, a cap surrounding said projection, means for feeding fluid fuel between said projection and cap, an outwardly-extending deflector carried by said cap, an inwardly-projecting deflector surrounding said fuel-receptacle, and means for adjusting the distance between said fuel-receptacle and said latter deflector.

5. The combination with an air-flue, of a fuel-receptacle arranged in said flue to leave an air-passage between said parts, a projection in said receptacle, a cap surrounding said projection, means for feeding fluid fuel between said cap and projection, a deflector carried by said cap, a second deflector carried by said air-flue and extending over said fuel-receptacle, and means for adjusting the distance between said latter deflector and said receptacle.

6. The combination with an air-flue, of a fuel-receptacle arranged in said flue to leave an air-passage between said parts, a projection in said receptacle, a cap surrounding said projection, means for feeding fluid fuel between said cap and projection, a deflector carried by said cap, a second deflector carried in said air-flue and extending over said fuel-receptacle, and means for adjusting said latter deflector to control the flow of air between said flue and fuel-receptacle.

7. The combination with an air-flue, of a fuel-receptacle arranged in said flue to leave a passage between said parts, a projection in said receptacle, a cap surrounding said projection, means for feeding fluid fuel between said projection and cap, an outwardly-extending deflector carried by said cap, a ring in said air-flue above said fuel-receptacle and forming an air-deflector therefor, and means situated outside of said flue for adjusting said ring.

8. The combination with an air-flue, of a fuel-receptacle arranged therein to leave an air-passage between said parts, a projection in said receptacle, a cap surrounding said projection, means for feeding fluid fuel between said projection and cap, an outwardly-extending deflector removably carried by said cap, a filling of porous refractory material in said receptacle, a set of vertical air-pipes passing through said receptacle, a set of inwardly-inclined pipes passing through said receptacle, an air-deflector arranged in said flue above said fuel-receptacle, and means for adjusting said air-deflector.

In testimony whereof we have hereunto set our hands and affixed our seals in the presence of the subscribing witnesses.

E. G. FLAGER. [L. S.]
FRED L. McGAHAN. [L. S.]

Witnesses:
W. A. ALEXANDER,
J. H. BRYSON.